United States Patent
Kurata et al.

(10) Patent No.: US 9,816,160 B2
(45) Date of Patent: *Nov. 14, 2017

(54) NI BALL, NI NUCLEAR BALL, SOLDER JOINT, FOAM SOLDER AND SOLDER PASTE

(71) Applicant: Senju Metal Industry Co., Ltd., Tokyo (JP)

(72) Inventors: Ryoichi Kurata, Tochigi (JP); Takashi Akagawa, Tochigi (JP); Hiroyoshi Kawasaki, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/022,320

(22) PCT Filed: Sep. 19, 2013

(86) PCT No.: PCT/JP2013/075288
§ 371 (c)(1),
(2) Date: Jul. 1, 2016

(87) PCT Pub. No.: WO2015/040714
PCT Pub. Date: Mar. 26, 2015

(65) Prior Publication Data
US 2016/0304992 A1    Oct. 20, 2016

(51) Int. Cl.
*C22C 19/03* (2006.01)
*B23K 35/26* (2006.01)
(Continued)

(52) U.S. Cl.
CPC ............ *C22C 19/03* (2013.01); *B22F 1/0011* (2013.01); *B22F 1/0048* (2013.01); *B22F 1/025* (2013.01); *B22F 9/082* (2013.01); *B23K 1/0016* (2013.01); *B23K 35/025* (2013.01); *B23K 35/0222* (2013.01); *B23K 35/0244* (2013.01); *B23K 35/22* (2013.01); *B23K 35/262* (2013.01); *B23K 35/30* (2013.01); *B23K 35/3033* (2013.01); *B23K 35/36* (2013.01); *B23K 35/40* (2013.01);
(Continued)

(58) Field of Classification Search
None
See application file for complete search history.

(56) References Cited

U.S. PATENT DOCUMENTS

| 2003/0062261 A1 | 4/2003 | Shindo |
|---|---|---|
| 2008/0012131 A1 | 1/2008 | Tanaka |
| 2013/0028786 A1 | 1/2013 | Kanou |

FOREIGN PATENT DOCUMENTS

| JP | 11261210 A | 9/1999 |
|---|---|---|
| JP | 200144315 A | 2/2001 |

(Continued)

*Primary Examiner* — Daniel J Schleis
(74) *Attorney, Agent, or Firm* — The Webb Law Firm

(57) ABSTRACT

To provide a Ni ball having a low α dose and high sphericity even when it contains impurity elements other than Ni in certain amounts. The Ni ball contains an element U, a content thereof being 5 ppb or less, and an element Th, a content thereof being 5 ppb or less, wherein a purity of the Ni ball is 99.9% or more but 99.995% or less, an α dose thereof is 0.0200 cph/cm$^2$ or less, a content of either Pb or Bi, or a total content of both Pb and Bi is 1 ppm or more, and a sphericity thereof is 0.90 or more, in order to prevent any software errors and reduce connection failure.

20 Claims, 2 Drawing Sheets

| (51) | Int. Cl. | |
|---|---|---|
| | B23K 35/30 | (2006.01) |
| | B23K 35/36 | (2006.01) |
| | B23K 35/40 | (2006.01) |
| | B23K 35/02 | (2006.01) |
| | B23K 35/22 | (2006.01) |
| | C22C 13/00 | (2006.01) |
| | C22F 1/00 | (2006.01) |
| | C22F 1/10 | (2006.01) |
| | B22F 1/00 | (2006.01) |
| | B22F 1/02 | (2006.01) |
| | B22F 9/08 | (2006.01) |
| | B23K 1/00 | (2006.01) |
| | C22C 13/02 | (2006.01) |
| | C22C 19/00 | (2006.01) |
| | C22C 19/05 | (2006.01) |
| | C22C 30/04 | (2006.01) |

(52) U.S. Cl.
CPC .............. *C22C 13/00* (2013.01); *C22C 13/02* (2013.01); *C22C 19/00* (2013.01); *C22C 19/058* (2013.01); *C22C 30/04* (2013.01); *C22F 1/00* (2013.01); *C22F 1/10* (2013.01); *B22F 2009/0824* (2013.01); *B22F 2009/0848* (2013.01); *B22F 2301/15* (2013.01); *B22F 2301/30* (2013.01); *B22F 2304/10* (2013.01); *B22F 2304/15* (2013.01)

(56) References Cited

FOREIGN PATENT DOCUMENTS

| JP | 200536301 A | 2/2005 |
|---|---|---|
| JP | 2005161338 A | 6/2005 |
| JP | 2007115857 A | 5/2007 |
| JP | 2011214040 A | 10/2011 |
| JP | 2011214061 A | 10/2011 |
| WO | 2011114824 A1 | 9/2011 |
| WO | 2012120982 A1 | 9/2012 |

[FIG1]
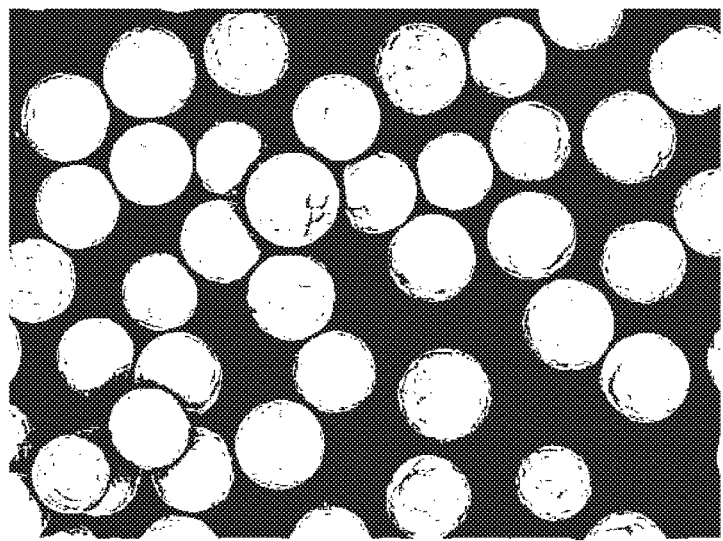
[FIG2]
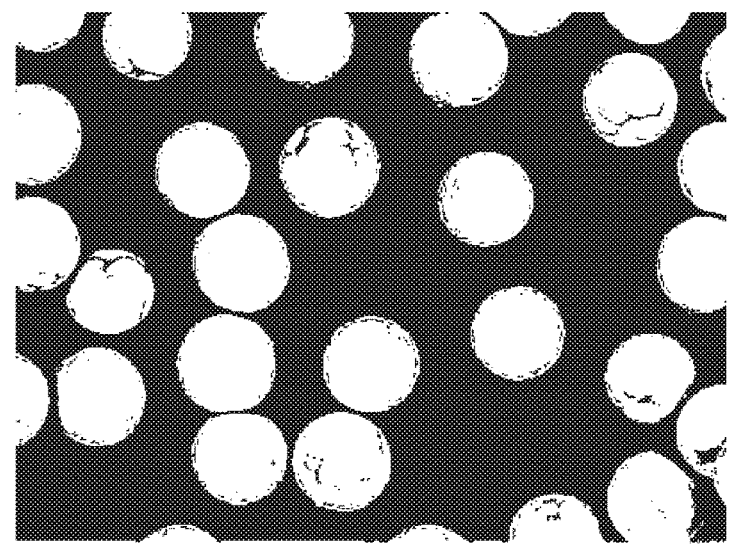

[FIG3]
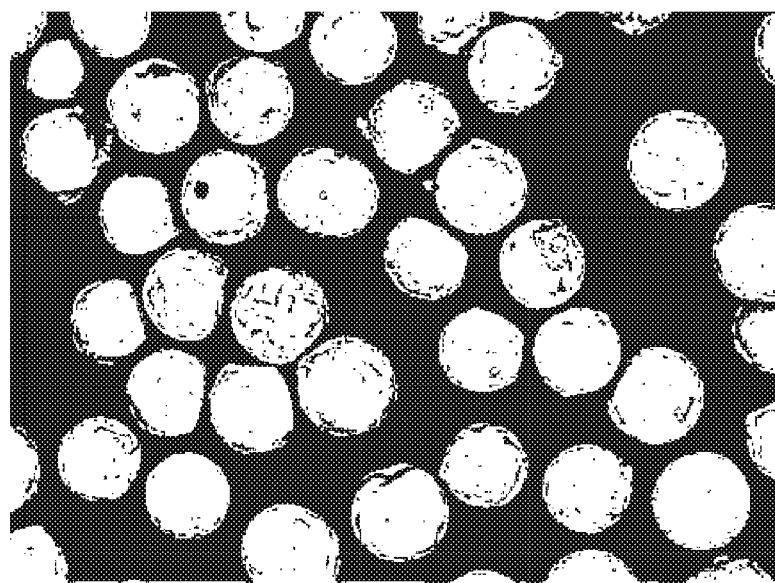

NI BALL, NI NUCLEAR BALL, SOLDER JOINT, FOAM SOLDER AND SOLDER PASTE

TECHNICAL FIELD

The present invention relates to a Ni ball having a low α dose, a Ni core ball in which the Ni ball is coated with solder plating, a solder joint using the Ni ball or Ni core ball, foam solder using the Ni ball or Ni core ball, and solder paste using the Ni ball or Ni core ball.

BACKGROUND ART

In recent years, with the development of small-size information equipment, rapid miniaturization of electronic components mounted thereon has been advanced. To the electronic components, a ball grid array (hereinafter referred to as "BGA") in which electrodes are arranged on a back surface is applied for corresponding to narrowing of connection terminals and/or reduction of mounting area by requirement of the miniaturization of electronic components.

As the electronic components to which BGA is applied, a semiconductor package has been exemplified. In the semiconductor package, semiconductor chips having electrodes are sealed with any resin. A solder bump is formed on each of the electrodes of semiconductor chips. This solder bump is formed by joining the solder ball to the electrode of the semiconductor chip. The semiconductor package to which BGA is applied is mounted on a printed board so that the solder bumps are in contact with the conductive land on the printed board and the solder bumps melted by heating and the land are joined to each other. In addition, in order to cope with a requirement of further high-density packing, any three-dimensional high-density packings in each of which the semiconductor packages are stacked in a height direction thereof have been studied.

However, when BGA is applied to a semiconductor package having such three-dimensional high-density packings, the solder balls may be crushed by the self-weight of the semiconductor package, and short circuits occur between the electrodes. This may hinder high-density packings from being constituted.

Therefore, solder bumps utilizing balls each having a very small diameter and being made of metal such as Ni having a melting point higher than that of the solder have been studied. When electronic components are mounted on a printed board, the solder bumps including Ni balls or the like can support the semiconductor package by the Ni balls which do not melt at the melting point of the solder, even if the weight of the semiconductor package is applied to the bumps. Thus, the solder bumps are not crushed by the self-weight of the semiconductor package. As the related art, for example, Patent Document 1 is listed.

By the way, the miniaturization of electronic components has allowed the high-density packing, but the high-density packing has caused software error problems. Software errors are caused by being capable of rewriting the stored contents of the memory cells of a semiconductor integrated circuit (hereinafter referred to as "IC") by enabling the α-ray to enter into them. It is conceivable that the α-ray radiates with α decay of radioactive isotopes such as U, Th, $^{210}$Po in the solder alloy. Therefore, in recent years, any low α-ray solder materials having a low radioactive isotopic content have been developed.

Therefore, the Ni balls contained in the solder as described in Patent Document 1 are also required to reduce software errors caused by the high-density packing.

Patent Document 1: Japanese Patent Application Publication No. 11-261210

SUMMARY OF INVENTION

However, until now, no consideration has been paid to the α-ray of Ni balls. Therefore, such a problem has not yet been solved that the α-ray radiates after solder joining of Ni balls accompanying with the diffusion of radioactive elements from the Ni balls and the α-ray radiated from the Ni balls enters into the memory cells of the semiconductor chips to cause software errors.

Accordingly, although there is a necessity of reducing the α-ray even at a solder joining part using Ni balls, no α dose of Ni balls has been studied, including Patent Document 1. It is conceivable that this is because, as before, Ni balls have been produced by heating Ni materials to 1500° C. or higher to melt them, so that the contents of radioactive isotopes radiating α-ray such as $^{210}$Po have been sufficiently reduced by volatilization, whereby the α-ray of Ni has not caused any software errors.

However, it has not been proved that the α-ray of the Ni balls can be reduced to such a degree that software errors are not caused under the conventional production conditions for Ni balls. $^{210}$Po has a boiling point of 962° C., and is also considered to be sufficiently vaporized by heating it at 1500° C. or higher to such a degree that software errors are not caused. However, heating during the production of Ni balls is not intended to vaporize $^{210}$Po, so that $^{210}$Po may not be always sufficiently reduced at this temperature. It is uncertain whether a Ni ball radiating low α-ray can be obtained by a conventional method for producing the Ni ball.

Here, it is also conceivable that the Ni balls are produced using Ni materials having a high purity, but there is no necessity of reducing the contents of the elements which are not concerned in α dose of the Ni balls. In addition, indiscriminate use of Ni having a high purity merely causes any increase in the costs therefor.

Furthermore, if sphericity, which indicates the degree of approximation to a true sphere, of the Ni balls is low, an intrinsic function of the Ni balls, that is, the control of the stand-off height during formation of solder bumps is not exhibited. As a result thereof, bumps having uneven heights may be formed, and any problems may occur on the mounting thereof. Under these circumstances, Ni ball having high sphericity has been desired.

The problem of the present invention is to provide a Ni ball having a low α dose and high sphericity even when it contains impurity elements other than Ni in certain amounts, a Ni core ball in which the Ni ball is coated with solder plating, and a solder joint using the Ni ball or Ni core ball.

The inventors have found that even though the purity of commercially available Ni material is from 99.9 to 99.99%, the U and Th thereof are reduced to 5 ppb or less. The purity of the metal material such as Ni is expressed as 2N for 99%, 3N for 99.9%, 4N for 99.99%, and 5N for 99.999%. In addition, the inventors have focused on that software errors are caused by $^{210}$Po which slightly remains at a content which cannot be quantitatively measured. In addition, the inventors have found that the α dose in the Ni ball is reduced to 0.0200 cph/cm$^2$ or less when the Ni material is heated, the temperature of the molten Ni is adjusted to be rather high, or the Ni ball after granulation is heated during production of the Ni ball, even if the purity of the Ni ball is 99.995% (hereinafter referred to as "4N5") or less.

Furthermore, the inventors have found that to enhance the sphericity of the Ni ball, the purity of the Ni ball is 4N5 or less, namely, the total content of the elements other than Ni in the Ni ball (hereinafter referred to as "impurity elements" as needed) is 50 ppm or more, and thus have accomplished the present invention.

The present invention will be described as follows.

(1) An Ni ball comprising an element U, a content thereof being 5 ppb or less, and an element Th, a content thereof being 5 ppb or less, wherein a purity of the Ni ball is 99.9% or more but 99.995% or less, an α dose thereof is 0.0200 cph/cm$^2$ or less, a content of either Pb or Bi, or a total content of both Pb and Bi is 1 ppm or more, and a sphericity thereof is 0.90 or more.

(2) The Ni ball of the above item (1), wherein the α dose is 0.0020 cph/cm$^2$ or less.

(3) The Ni ball of the above item (1) or (2), wherein the α dose is 0.0010 cph/cm$^2$ or less.

(4) The Ni ball of any one of the above items (1) to (3), wherein the diameter thereof is from 1 to 1000 μm.

(5) Foam solder including the Ni ball of any one of the above items (1) to (4), the Ni ball being dispersed in the solder.

(6) Solder paste including the Ni ball of any one of the above items (1) to (4).

(7) An Ni core ball including the Ni ball of any one of the above items (1) to (4), and solder plating coating the Ni ball.

(8) The Ni core ball of the above item (7), wherein the α dose is 0.0200 cph/cm$^2$ or less.

(9) The Ni core ball of the above item (7), wherein the α dose is 0.0020 cph/cm$^2$ or less.

(10) The Ni core ball of the above item (7), wherein the α dose is 0.0010 cph/cm$^2$ or less.

(11) Foam solder including the Ni core ball of any one of the above items (7) to (10), the Ni core ball being dispersed in the solder.

(12) Solder paste including the Ni core ball of any one of the above items (7) to (10).

(13) A solder joint including the Ni ball of any one of the above items (1) to (4).

(14) A solder joint including the Ni core ball of any one of the above items (7) to (10).

BRIEF DESCRIPTION OF DRAWINGS

FIG. 1 is an SEM photograph of an Ni ball of Executed Example 1.
FIG. 2 is an SEM photograph of the Ni ball of Executed Example 2.
FIG. 3 is an SEM photograph of the Ni ball of Comparative Example 1.

DESCRIPTION OF THE INVENTION

The present invention will be described in detail. In the present description, the units relating to the composition of the Ni ball (ppm, ppb, and %) represent the proportions with respect to the mass of the Ni ball (mass ppm, mass ppb, and % by mass), unless otherwise specified. In addition, the units relating to the composition of the solder film in the Ni core ball (ppm, ppb, and %) represent the proportions with respect to the mass of the solder film (mass ppm, mass ppb, and % by mass), unless otherwise specified.

The Ni ball according to the present invention contains a U content of 5 ppb or less, and a Th content of 5 ppb or less, wherein a purity thereof is 99.9% or more but 99.995% or less, an α dose thereof is 0.0200 cph/cm$^2$ or less, a content of either Pb or Bi, or a total content of both Pb and Bi is 1 ppm or more, and a sphericity thereof is 0.90 or more.

The following will describe composition, α dose, and sphericity of the Ni ball according to the present invention in detail.

U: 5 ppb or Less, Th: 5 ppb or Less

U and Th are radioactive isotopes, and their contents may be required to decrease to prevent software errors. Each of the U and Th contents may be required to be 5 ppb or less, in order to restrain the α dose in the Ni ball from being 0.0200 cph/cm$^2$ or less. In addition, from the viewpoint of preventing software errors in the present or future high-density packing, each of the U and Th contents is preferably 2 ppb or less.

Ni Ball Purity: 99.9% or More but 99.995% or Less

The Ni ball according to the present invention has a purity of 3N or more and 4N5 or less. In other words, the Ni ball according to the present invention has an impurity element content of 50 ppm or more. When the purity of the Ni constituting the Ni ball is within this range, a sufficient amount of crystal nuclei for enhancing the sphericity of the Ni ball can be secured in the molten Ni. The reason why the sphericity is enhanced will be described in detail as follows.

When producing the Ni balls, the Ni material formed into small pieces to have a certain shape is melted by heating and the molten Ni is made spherical by the surface tension, which are solidified to make Ni balls. During solidification of the molten Ni from a liquid state thereof, the crystal grains grow in the spherical molten Ni. At this moment, if impurity elements are abundant, these impurity elements work as crystal nuclei, and hinder the growth of crystal grains. Accordingly, the spherical molten Ni forms Ni balls having a high sphericity owing to the inhibition of the growth of fine crystal grains.

On the other hand, if the amount of impurity elements is small, the amount of elements to be made crystal nuclei is relatively small. The grains grow into a certain direction without inhibition of growth of the grains. As a result of this, spherical molten Ni is solidified with the surface being partly protruded. Such Ni ball has a low sphericity. The impurity elements are likely Sn, Sb, Bi, Zn, Fe, Al, As, Ag, In, Cd, Cu, Pb, Au, P, S, U, Th and the like.

The lower limit of the purity is not particularly limited, but is preferably 3N or more, from the viewpoint of reducing the α dose, and preventing deterioration of electric conduction and heat conductivity of the Ni ball caused by decrease of the purity. In other words, the content of the impurity elements excluding Ni in the Ni ball is preferably 1000 ppm or less.

α Dose: 0.0200 cph/cm$^2$ or Less

The α dose in the Ni ball according to the present invention is 0.0200 cph/cm$^2$ or less. This is α dose that does not cause any software error problems in the high-density packing of electronic components. In the present invention, the Ni ball is subjected to heating treatment again, in addition to the ordinary processes carried out for producing Ni balls. Therefore, $^{210}$Po slightly remaining in the Ni material evaporates, and the Ni balls exhibit a further lower α dose than that of the Ni material. The α dose is preferably 0.0020 cph/cm$^2$ or less, and more preferably 0.0010 cph/cm$^2$ or less from the viewpoint of preventing software errors in higher density mounting.

Content of Either Pb or Bi or Total Content of Pb and Bi of 1 ppm or More

Impurity elements are likely Sn, Sb, Bi, Zn, Fe, Al, As, Ag, In, Cd, Cu, Pb, Au, P, S, U, Th and the like. The Ni ball according to the present invention preferably contains, among the impurity elements listed above, the content of either Pb or Bi or a total content of 1 ppm or more as the impurity elements. In the present invention, in order to reduce the α dose, it is not required to reduce the content of either Pb or Bi, or the total content of Pb and Bi to the minimum.

The reason is as follows.

$^{210}$Pb turns to $^{210}$Bi by β decay, and $^{210}$Bi turns to $^{210}$Po by β decay, and $^{210}$Po turns to $^{206}$Pb by α decay. Therefore, in order to reduce the α dose, it is conceivable that the content of either or both of Pb and Bi as impurity elements is preferably as low as possible.

However, the content ratio of $^{210}$Pb contained in Pb and $^{210}$Bi contained in Bi is low. Accordingly, if the Pb and Bi contents are reduced to a certain degree, it is conceivable that $^{210}$Pb and $^{210}$Bi are sufficiently removed to the degree which allows the α dose to be reduced to the above-described range. On the other hand, in order to enhance the sphericity of the Ni ball, as described above, the impurity element content is preferably high. When both of Pb and Bi as impurity elements are contained in the Ni material, they work as crystal nuclei during the melting in the production process of the Ni ball, so that the sphericity of the Ni ball can be enhanced. Therefore, it is preferred that either Pb or Bi or both of Pb and Bi are contained in an amount which allows the removal of $^{210}$Pb and $^{210}$Bi to such a degree that the α dose is reduced to the above-described range. From this viewpoint, it is preferred that the Ni ball according to the present invention has a content of either Pb or Bi or a total content of Pb and Bi of 1 ppm or more.

The content of either Pb or Bi or the total content of Pb and Bi is more preferably 10 ppm or more. The upper limit is no limited if the α dose is reduced, but the content of either Pb or Bi or the total content of Pb and Bi is more preferably less than 1000 ppm, from the viewpoint of reducing deterioration of electric conductivity of the Ni ball. The Pb content is more preferably from 10 ppm to 50 ppm, and the Bi content is more preferably from 10 ppm to 50 ppm.

Sphericity of Ni Ball: 0.90 or More

The sphericity of the Ni ball according to the present invention is preferably 0.90 or more, from the viewpoint of controlling the stand-off height. If the sphericity of the Ni ball is less than 0.90, the Ni ball has an indefinite shape, so that bumps having uneven heights are formed during bump formation, and the possibility of occurrence of joining defect increases. The sphericity is more preferably 0.94 or more. In the present invention, the sphericity represents the deviation from a true sphere. The sphericity is determined by various kinds of methods such as the least squares circle method (LSC method), minimum zone circle method (MZC method), the maximum inscribed circle method (MIC method), or minimum circumscribed circle method (MCC method).

Diameter of Ni Ball: 1 to 1000 μm

The diameter of the Ni ball according to the present invention is preferably from 1 to 1000 μm. When it is within this range, a spherical Ni ball can be stably produced or it is possible to prevent the short circuit caused by a narrow pitch between the terminals. Here, for example, when the Ni ball(s) according to the present invention is (are) used in paste, the "Ni ball" may be referred to as "Ni powder". When the "Ni ball" is used as "Ni powder", the diameter of the Ni ball is commonly from 1 to 300 μm.

The Ni ball according to the present invention is applicable to a so-called Ni core ball in which the Ni ball of the present invention is configured as a core whose surface is coated with any solder plating. In addition, when the Ni ball of the present invention is used in the Ni core ball, it may be subjected to strike plating treatment in advance using a hydrochloric acid Ni solution or the like. The strike plating treatment removes the oxide film from the Ni surface, so that close adhesion quality between the Ni ball and solder plating can be improved during the production of the Ni core ball. Furthermore, the Ni ball and Ni core ball of the present invention may be used in a solder joint of an electronic component.

In addition, the Ni ball and Ni core ball of the present invention may be used in foam solder in which Ni balls or Ni core balls are dispersed in the solder. Furthermore, the Ni ball and Ni core ball of the present invention may be used in solder paste in which solder powder, Ni balls or Ni core balls, and flux are mixed. In the foam solder and solder paste, for example, a solder alloy having a composition of Sn-3Ag-0.5Cu (each value is based on % by mass) is used. It is to be noted that the present invention is not limited to this solder alloy.

The Ni core ball according to the present invention will be described in detail. The Ni core ball includes the above-described Ni ball, and a solder plating film coating a surface of the Ni ball. The solder plating film of the present invention is formed mainly by fluidizing the Ni ball as workpieces and plating solution. Fluidization of the plating solution causes the salt formation and precipitation of the elements Pb, Bi, and Po. Once the deposits as salts are formed, they stably exist in the plating solution. Accordingly, the Ni core ball according to the present invention can reduce the radioactive element content in the solder film without inclusion of the deposit in the solder film to reduce the α dose in the Ni core ball itself.

The following will describe the solder plating film constituting the Ni core ball in detail.

Composition of Solder Plating Film

In a case of an alloy, the composition of the solder plating film is not particularly limited as long as it is a composition of a lead free solder alloy composed mainly of Sn. In addition, the solder plating film may be an Sn plating film. Listed are, for example, Sn, an Sn—Ag alloy, an Sn—Cu alloy, an Sn—Ag—Cu alloy, an Sn—In alloy, and mixtures of these alloys to which predetermined alloy element(s) is (are) added. In all of them, the Sn content is 40% by mass or more. As the alloy element(s) to be added, for example, Ag, Cu, In, Ni, Co, Sb, Ge, P and Fe are listed. Among them, the alloy composition of the solder plating film is preferably an Sn-3Ag-0.5Cu alloy, from the viewpoint of dropping shock properties.

The thickness of the solder plating film is not particularly limited, but is preferably sufficient for 100 μm (each side) or less. Generally, only 20 through 50 μm are needed.

U: 5 ppb or Less, Th: 5 ppb or Less

As explained in the above-mentioned section of the Ni ball, U and Th are radioactive isotopes, and their contents may be required to decrease to prevent software errors. Each of the U and Th contents may be required to be 5 ppb or less, in order to restrain the α dose in the solder plating film from being 0.0200 cph/cm$^2$ or less. In addition, from the viewpoint of preventing software errors in the present or future high-density packing, each of the U and Th contents is preferably 2 ppb or less.

α Dose: 0.0200 cph/cm$^2$ or Less

The α dose of the Ni core ball according to the present invention is 0.0200 cph/cm$^2$ or less, which is similar to that of the Ni ball. This is α dose such that it does not cause problems of software errors in the high-density packing of electronic components. The α dose of the Ni core ball according to the present invention is achieved when the α dose of the Ni ball constituting the Ni core ball is 0.0200 cph/cm$^2$ or less as described above, and the α dose in the solder plating film constituting the Ni core ball is 0.0200 cph/cm$^2$ or less.

The solder plating film of the present invention is formed at up to 100° C., so that it is hard to think that the radioactive element content is reduced by vaporization of radioactive elements such as U, Th, $^{210}$Po, Bi and Pb. However, when plating is carried out under fluidization of the plating solution and Ni balls, U, Th, Pb, Bi and $^{210}$Po form salts in the plating solution to be precipitated. The precipitated salts are electrically neutral, and do not contaminate the solder plating film even if the plating solution is fluidized.

Therefore, their contents in the solder plating film markedly decrease. Accordingly, the Ni core ball according to the present invention is coated by such a solder plating film, so that it shows a low α dose. The α dose is preferably 0.0020 cph/cm$^2$ or less, and more preferably 0.0010 cph/cm$^2$ or less, from the viewpoint of preventing software errors in higher density mounting.

The lower limit of the impurity amount is not particularly limited, because the content of radioactive elements and the α dose decrease as the purity of the solder plating film constituting the Ni core ball according to the present invention increases, or the impurity content decreases. On the other hand, the upper limit thereof is preferably 150 ppm or less, more preferably 100 ppm or less, even more preferably 50 ppm or less, and particularly preferably 10 ppm or less, from the viewpoint of reducing the α dose.

When the solder plating film is an Sn solder, the purity of the solder plating film is the total content of impurities other than Sn in the solder plating film. When the solder plating film is a solder alloy of Sn-3Ag-0.5Cu, the purity of the solder plating film is the total content of impurities other than Sn, Ag, and Cu in the solder plating film.

In a case of the Sn solder plating film, as the impurities contained in the solder plating film, Ag, Ni, Pb, Au, U and Th are listed. In a case of the solder plating film composed of the Sn—Ag—Cu alloy, Sb, Fe, As, In, Ni, Pb, Au, U and Th are listed.

It is preferable that of the impurities contained in the solder plating film, the Bi content is particularly small. The raw material of Bi contains a trace amount of $^{210}$Bi which is a radioisotope. Accordingly, it is conceivable that by the reduction of the Bi content, the α dose in the solder plating film can be markedly reduced. The Bi content in the solder plating film is preferably 15 ppm or less, more preferably 10 ppm or less, and particularly preferably 0 ppm.

Here, regarding the diameter of the Ni core ball according to the present invention, when the diameter of the Ni core ball is, for example, about 1 to 300 μm, the aggregate of "Ni core balls" may be referred to as "Ni core powder". The "Ni core powder" herein is the aggregate of many Ni core balls in which each Ni core ball has the above-described properties. This is, for example, mixed as the powder in a solder paste, and its use condition is different from that of a single Ni core ball. Similarly, when it is used for the formation of a solder bump, this is usually used as an aggregate, so that the "Ni core powder" used in such a condition is discriminated from a single Ni core ball.

An example of a method for producing a Ni ball according to the present invention will be described. An atomization method of the present invention is a method including melting Ni materials at a high temperature and spraying molten Ni in a liquid state from a nozzle at a high speed, thereby cooling the atomized molten Ni to form Ni balls. When gas is used as the medium for spraying the molten Ni from the nozzle at a high speed, the method is referred to as a gas atomization method, and when water is used, the method is referred to as a water atomization method. In the present invention, either of the atomization methods may be used for producing the Ni balls.

As another atomization method, a method may be used in which droplets of molten Ni are dropped from an orifice and the droplets are cooled to form the Ni balls. The Ni balls formed by any of the atomization methods may be subjected to re-heating at a temperature of 800 to 1000° C. for 30 to 60 minutes.

In these methods for producing the Ni balls, the Ni materials may be preliminary heated at 800 to 1000° C. before formation of the Ni balls.

The Ni materials as raw materials of the Ni ball may be, for example, pellets, wire, or plate materials. The purity of the Ni material may be from 2 N to 4 N, from the viewpoint of not excessively decreasing the purity of the Ni ball.

When Ni materials having such high purity are used, the retention temperature for the molten Ni may be decreased to about 1000° C., which is similar to the conventional one, without carrying out the above-described heating treatment. In this manner, the above-described heating treatment may be appropriately omitted or changed according to the purity and α dose of the Ni material. In addition, when a Ni ball having a high α dose and an odd-form Ni ball are produced, these Ni balls may be reused as raw materials, which allow further decrease of the α dose.

In the next place, an example of the method for producing the Ni core ball according to the present invention will be described. As the method for forming a plating film on a Ni ball by fluidizing the Ni ball prepared as described above and the plating solution, listed are an electrolysis plating method such as known barrel plating, a method for forming a plating film on the Ni ball by causing a high speed turbulent flow in the plating solution in a plating bath using a pump connected to the plating bath, and a method for vibrating a vibrating plate, which is provided in the plating bath, at a certain frequency to stir the plating solution by a high speed turbulent flow, thereby forming a plating film on a Ni ball by the turbulent flow of the plating solution.

An example will be described in which the Ni ball having a diameter of 100 μm are coated with an Sn—Ag—Cu solder plating film having a film thickness (each side) of 20 μm to produce the Ni core ball having a diameter of about 140 μm.

The Sn—Ag—Cu-containing plating solution according to one embodiment of the present invention includes a medium composed mainly of water, sulfonic acids and Sn, Ag and Cu as metal components, as essential components.

The metal components exist in the form of Sn ion ($Sn^{2+}$ and/or $Sn^{4+}$), Ag ion ($Ag^+$) and Cu ion ($Cu^+/Cu^{2+}$) in the plating solution. The plating solution is obtained by mixing a mother plating solution, which is composed mainly of water and sulfonic acids, and metal compounds, and preferably contains an organic complexing agent, thereby stabilizing the metal ions.

As the metal compounds in the plating solution, for example, the followings can be listed.

As specific examples of the Sn compounds, listed are tin salts of organic sulfonic acid such as methanesulfonic acid, ethanesulfonic acid, 2-propanolsulfonic acid and p-phenolsulfonic acid, and primary Sn compounds such as tin sulfate, tin oxide, tin nitrate, tin chloride, tin bromide, tin iodide, tin phosphate, tin pyrophosphate, tin acetate, tin formate, tin citrate, tin gluconate, tin tartrate, tin lactate, tin succinate, tin sulfamate, tin tetrafluoroborate, and tin hexafluorosilicate. These Sn compounds may be used alone or in combination of two or more of them.

As the Cu compounds, listed are copper salts of the above-described organic sulfonic acid, copper sulfate, copper oxide, copper nitrate, copper chloride, copper bromide, cuprous iodide, copper phosphate, copper pyrophosphate, copper acetate, copper formate, copper citrate, copper gluconate, copper tartrate, copper lactate, copper succinate, copper sulfamate, copper tetrafluoroborate, and copper hexafluorosilicate. These Cu compounds may be used alone or in combination of two or more of them.

As the Ag compounds, listed are silver salts of the above-described organic sulfonic acid, silver sulfate, silver oxide, silver chloride, silver nitrate, silver bromide, silver iodide, silver phosphate, silver pyrophosphate, silver acetate, silver formate, silver citrate, silver gluconate, silver tartrate, silver lactate, silver succinate, silver sulfamate, silver tetrafluoroborate, and silver hexafluorosilicate. These Ag compounds may be used alone or in combination of two or more of them.

Further, when a Sn—Ag—Cu solder plating film having a film thickness (each side) of 20 μm is formed on a Ni ball having a diameter of 100 μm, a quantity of electricity of about 0.0108 coulomb is required.

The amounts of the metals in the plating solution are: from 0.21 to 2 mol/L, preferably from 0.25 to 1 mol/L of $Sn^{2+}$, from 0.01 to 0.1 mol/L, preferably from 0.02 to 0.05 mol/L of Ag, and from 0.002 to 0.02 mol/L, preferably from 0.003 to 0.01 mol/L of Cu. In the present invention, it has only to adjust the amount of $Sn^{2+}$ because $Sn^{2+}$ contributes to plating.

The Ag ion concentration to the Cu ion concentration (Ag/Cu molar ratio) is preferably from 4.5 to 5.58. When the concentration is within this range, an Sn—Ag—Cu plating film having a low melting point, such as an Sn-3Ag-0.5 Cu alloy can be formed.

In addition, according to the Faraday's electrolysis law, the desired deposition amount of solder plating is estimated by the following equation (1), the quantity of electricity is calculated, the electric current is passed through the plating solution so as to give the calculated quantity of electricity, and plating treatment is carried out while fluidizing the Ni balls and plating solution. The volume of the plating bath may be determined according to the total input of the Ni balls and plating solution.

$$w(g) = (I \times t \times M)/(Z \times F) \qquad \text{Equation (1)}$$

In the equation (1), w is the amount of electrolytic deposition (g), I is the current (A), t is the energization time (second), M is the atomic weight of the deposited element (118.71 for Sn), Z is the valence (bivalence for Sn), F is Faraday's constant (96500 coulomb), and the quantity of electricity Q (A·second) is represented by (1×t).

In the present invention, plating is carried out while the Ni balls and plating solution are fluidized. The method for fluidizing them is not particularly limited. For example, the Ni balls and plating solution can be fluidized by rotation of the barrel, which is similar to the one used in the barrel electrolysis plating method.

After the plating treatment, they are dried in the air or in an $N_2$ atmosphere, so that the Ni core balls according to the present invention can be obtained.

EXECUTED EXAMPLES

Executed examples of the Ni ball of the present invention will be described, but the present invention is not limited to them.

Executed Example 1

Ni wire having a purity of 3N (α dose: 0.0034 cph/cm$^2$, U: 0.7 ppb, Th: 0.5 ppb) was charged into a crucible, and preliminarily heated at 1000° C. for 45 minutes. Thereafter, the ejection temperature was adjusted at 1600° C., preferably 1700° C., molten Ni in a liquid state was sprayed from a nozzle at a high speed according to the gas atomization method, and the atomized molten Ni was cooled to form Ni balls. In this manner, Ni balls having an average particle size of 50 μm were made. Table 1 shows the result of elemental analysis, α dose, and sphericity of the Ni balls thus made. The methods for measuring the α dose and sphericity will be described below in detail.

α Dose

For the measurement of the α dose, an α-ray measuring device of a gas flow proportional counter was used. The measurement sample was Ni balls bedded on a flat shallow container of 300 mm×300 mm. This measurement sample was placed in the α-ray measuring device, allowed to stand for 24 hours in a PR-10 gas flow, and then the α dose was measured. The PR-10 gas (argon 90%-methane 10%) used for the measurement was the PR-10 gas after a lapse of three weeks or more after charging it into a gas cylinder. The cylinder after a lapse of three weeks or more was used in accordance with the guideline for the α-ray measurement method defined in JEDEC (Joint Electron Device Engineering Council), whereby no α-ray is emitted by atmospheric radon entering into the gas cylinder.

Sphericity

The sphericity was measured by a CNC image measurement system. The apparatus was Ultra Quick Vision, ULTRA QV350-PRO, manufactured by Mitsutoyo Corporation.

FIG. 1 shows an SEM photograph of the Ni balls thus made. The magnification of the SEM photograph is 300 times.

Executed Example 2

Ni balls were produced in the same manner as in Executed Example 1, except that Ni wire having a purity of 4N5 or less (α dose: 0.0026 cph/cm$^2$, U: <0.5 ppb, Th: <0.5 ppb) was used. The elemental analysis and α dose measurement were carried out. The results are shown in Table 1. In addition, FIG. 2 shows an SEM photograph of the Ni balls produced in Executed Example 2. The magnification of the SEM photograph is 300 times.

Comparative Example 1

Ni balls were produced in the same manner as in Executed Example 1, except that a Ni plate having a purity of 5N, which is higher than 4N5 (α dose: <0.0010 cph/cm$^2$, U: <0.5 ppb, Th: <0.5 ppb) was used. The elemental analysis and α dose measurement were carried out. The results are shown in Table 1. In addition, FIG. 3 shows an SEM photograph of the Ni balls made in Comparative Example 1. The magnification of the SEM photograph is 300 times.

Comparative Example 2

For reference, Table 1 shows the result of the elemental analysis and α dose of the Ni wire having a purity of 3N (α dose: 0.0034 cph/cm$^2$, U: 0.8 ppb, Th: 0.5 ppb) before formation of balls.

TABLE 1

| | Components of Ni | | | | | | | | | | | | | | |
|---|---|---|---|---|---|---|---|---|---|---|---|---|---|---|---|
| | Ni | Sb | Cu | Bi | Zn | Fe | Al | As | Cd | Sn | Pb | Ag | In | Au | P |
| Executed Example 1 | Bal. | 18 | 23 | 71 | 2 | 39 | 0 | 58 | 2 | 63 | 67 | 49 | 18 | 2 | 2 |
| Executed Example 2 | Bal. | 12 | 0 | 0 | 0 | 0 | 0 | 27 | 2 | 0 | 0 | 11 | 0 | 0 | 2 |
| Comparative Example 1 | Bal. | 4 | 0 | 0 | 0 | 0 | 0 | 6 | 0 | 0 | 0 | 0 | 0 | 0 | 2 |

TABLE 1-continued

| | | | | | | | | | | | | | | |
|---|---|---|---|---|---|---|---|---|---|---|---|---|---|---|
| Comparative Example 2 | Bal. | 21 | 22 | 72 | 2 | 39 | 0 | 62 | 3 | 64 | 65 | 49 | 18 | 2 | 8 |

| | Components of Ni | | | | | | | | |
|---|---|---|---|---|---|---|---|---|---|
| | S | Mg | Ti | Co | Mn | U | Th | Total impurity amount | α dose cph/cm² | Ni ball sphericity |
| Executed Example 1 | 19 | 0 | 5 | 61 | 13 | 0.7 | 0.5 | 512 | <0.0010 | 0.9460 |
| Executed Example 2 | 8 | 0 | 0 | 12 | 0 | <0.5 | <0.5 | 74 | <0.0010 | 0.9426 |
| Comparative Example 1 | 6 | 0 | 0 | 7 | 0 | <0.5 | <0.5 | 25 | <0.0010 | 0.8983 |
| Comparative Example 2 | 25 | 0 | 4 | 61 | 15 | 0.8 | 0.5 | 532 | 0.0034 | — |

\* Elemental analysis of U and Th was carried out by ICP MS, and other elements were analyzed by ICP-AES.
\* The unit of the result of elemental analysis of alloy composition is expressed in the unit of ppb by mass only for U and Th.
The unit of other elements and total impurity amount is ppm by mass.

As shown in Table 1, the α dose of the Ni balls of Executed Examples 1 and 2 was less than 0.0010 cph/cm², even though the purity thereof was 4N5 or less, and the Bi and Pb contents were 10 ppm or more. In addition, the purity of the Ni balls of Comparative Example 1 was higher than 4N5, so that consequently the α dose was less than 0.0010 cph/cm². In addition, the α dose of the Ni balls of Executed Examples 1 and 2 was less than 0.0010 cph/cm² for at least 2 years. Accordingly, the Ni balls of Executed Examples 1 and 2 solved the problem of recent years, that is, the increase of the α dose by changes with time.

As shown in FIGS. 1 and 2, the sphericity of the Ni balls of Executed Examples 1 and 2 was 0.94 or more, because they had purity of 4N5 or less (the content of the elements excluding Ni was 50 ppm or more). On the other hand, as shown in FIG. 3, the sphericity of the Ni balls of Comparative Example 1 was below 0.90, because the purity thereof was higher than 4N5 (the content of the elements excluding Ni was less than 50 ppm).

Executed Example 3

A solder plating film composed mainly of Sn is formed on each of the Ni balls produced in Executed Example 1 under the following conditions to produce Ni core balls.

The Ni core balls were subjected to plating treatment using the following plating solution, in such a manner that the Ni balls having a diameter of 50 μm were coated with solder plating having a film thickness (each side) of 20 μm, at a quantity of electricity of about 0.0038 coulombs. After the treatment, they were dried in the air, thereby obtaining Ni core balls. The cross section of the Ni core balls coated with the solder plating film was observed by a SEM photograph and the film thickness was about 40 μm.

The solder plating solution was prepared as follows. Water was placed in a stirring vessel in an amount of one third of the amount needed for the preparation of the plating solution, and a 54% by weight of methane sulfonic acid aqueous solution was added thereto in a total amount, thereby preparing a pool. Subsequently, acetyl cysteine, which was a mercaptan compound as a complexing agent, was added thereinto, its dissolution was confirmed, and then 2,2'-dithio dianiline, which was an aromatic amino compound as another complexing agent, was added thereinto. When the liquid turned to a light blue gel, tin methanesulfonate (I) was immediately added.

In the next place, two thirds of the necessary amount of water to the plating solution was added, and 3 g/L of α-naphthol polyethoxylate (EO 10 mol) as an example of surfactant was finally added, thus completing the preparation of the plating solution. The plating solution thus made had a methanesulfonic acid concentration of 2.64 mol/L, and a tin ion concentration of 0.337 mol/L. The tin methanesulfonate (I) used in the present example was prepared using the following Sn sheet material as a raw material.

The elemental analysis of the solder plating film formed on the surface of the Ni core ball, and referential elemental analysis of the Sn sheet material as a raw material of the solder plating solution were carried out by high frequency inductively coupled plasma mass spectrometry (ICP-MS analysis) for U and Th, and high frequency inductively coupled plasma-atomic emission spectral analysis (ICP-AES analysis) for other elements. The α dose of the Sn sheet material was measured in the same manner as for the Ni balls, except that the Sn sheet material was spread on a flat shallow container of 300 mm×300 mm. The α dose of the Ni core balls was measured in the same manner as for the above-described Ni balls. In addition, the sphericity of the Ni core balls was also measured under the same conditions for the Ni balls. Table 2 shows the results of these measurements.

TABLE 2

| | Composition of solder film and Sn sheet material | | | | | | | | | | | | | | | α dose | Ni core ball |
|---|---|---|---|---|---|---|---|---|---|---|---|---|---|---|---|---|---|
| | Sn | Sb | Cu | Bi | Zn | Fe | Al | As | Ag | In | Cd | Ni | Pb | Au | U | Th | (cph/cm²) | sphericity |
| Executed Example 3 | bal. | 0 | 0 | 0 | 0 | 1 | 0 | 0 | 3 | 2 | 0 | 2 | 3 | 0 | <0.2 | <0.2 | <0.0010 | 0.9471 |
| Sn sheet material | bal. | 11 | 0 | 18 | 0 | 5 | 0 | 21 | 6 | 11 | 0 | 30 | 49 | 1 | <0.2 | <0.2 | 0.203 | — |

\* The unit of Un and Th is ppb by mass, and that of other element is ppm by mass.

Table 2 indicates that the α dose has exceeded 0.2 cph/cm² in the stage of the Sn sheet material, but the α dose is less than 0.0010 cph/cm² in Executed Example 3 in which the Nil ball is subjected to solder plating using the Sn sheet material. It is verified that the α dose of the Ni core ball of Executed Example 3 is reduced by forming a solder plating film by a plating method.

The Ni core balls of Executed Example 3 have shown no increase in the α dose, even after the lapse of two years after making.

Regarding the use Ni ball or Ni core ball of the present invention, they may be used in a foam solder prepared by dispersing the Ni balls or Ni core balls in a solder other than such a manner that a solder paste is applied to an electrode and then, the Ni balls or Ni core balls are mounted directly on the paste and jointed thereto. Alternatively, the Ni balls or Ni core balls may be used in the form of a solder paste, which is prepared by mixing a solder powder, a flux, and Ni balls or Ni core balls. At this time, two or more species of solder powders having different compositions and particle sizes may be added simultaneously.

When used by the above-described method, the compositions of the solder paste, solder alloy for foam solder, and solder powder for solder paste used together with Ni balls or Ni core balls are not particularly limited, but the α dose is preferably 0.0200 cph/cm$^2$ or less.

The invention claimed is:

1. An Ni ball comprising:
   an element U, a content thereof being 5 ppb or less; and
   an element Th, a content thereof being 5 ppb or less;
   wherein a purity of the Ni ball is 99.9% by mass or more but 99.995% by mass or less, an α dose thereof is 0.0200 cph/cm$^2$ or less, a content of either Pb or Bi, or a total content of both Pb and Bi is 1 ppm or more, and a sphericity thereof is 0.90 or more.

2. The Ni ball of claim 1, wherein the α dose is 0.0020 cph/cm$^2$ or less.

3. The Ni ball of claim 1, wherein the α dose is 0.0010 cph/cm$^2$ or less.

4. The Ni ball of claim 1, wherein the diameter thereof is from 1 to 1000 μm.

5. Foam solder including the Ni ball of claim 1, the Ni ball being dispersed in the solder.

6. Solder paste including the Ni ball of claim 1.

7. An Ni core ball including the Ni ball of claim 1, and solder plating coating the Ni ball.

8. The Ni core ball of claim 7, wherein the α dose is 0.0200 cph/cm$^2$ or less.

9. The Ni core ball of claim 7, wherein the α dose is 0.0020 cph/cm$^2$ or less.

10. The Ni core ball of claim 7, wherein the α dose is 0.0010 cph/cm$^2$ or less.

11. Foam solder including the Ni core ball of claim 7, the Ni core ball being dispersed in the solder.

12. Solder paste including the Ni core ball of claim 7.

13. A solder joint including the Ni ball of claim 1.

14. A solder joint including the Ni core ball of claim 7.

15. The Ni ball of claim 2, wherein the diameter thereof is from 1 to 1000 μm.

16. The Ni ball of claim 3, wherein the diameter thereof is from 1 to 1000 μm.

17. Foam solder including the Ni ball of claim 2, the Ni ball being dispersed in the solder.

18. Foam solder including the Ni ball of claim 3, the Ni ball being dispersed in the solder.

19. Foam solder including the Ni core ball of claim 8, the Ni core ball being dispersed in the solder.

20. Foam solder including the Ni core ball of claim 9, the Ni core ball being dispersed in the solder.

* * * * *